United States Patent
Koo

(10) Patent No.: US 8,285,260 B2
(45) Date of Patent: Oct. 9, 2012

(54) MOBILE TERMINAL AND MULTIMEDIA MESSAGE PROCESSING METHOD THEREOF

(75) Inventor: Yong Min Koo, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 846 days.

(21) Appl. No.: 12/291,459

(22) Filed: Nov. 10, 2008

(65) Prior Publication Data

US 2009/0124242 A1    May 14, 2009

(30) Foreign Application Priority Data

Nov. 12, 2007 (KR) .................. 10-2007-0114706

(51) Int. Cl.
H04M 3/42 (2006.01)
H04W 4/00 (2009.01)

(52) U.S. Cl. .................... 455/414.1; 455/466

(58) Field of Classification Search ............ 455/414.1, 455/466
See application file for complete search history.

(56) References Cited

U.S. PATENT DOCUMENTS

| | | | |
|---|---|---|---|
| 6,563,913 B1* | 5/2003 | Kaghazian | 379/93.24 |
| 7,437,169 B2* | 10/2008 | Khoury et al. | 455/466 |
| 7,512,658 B2* | 3/2009 | Brown et al. | 709/206 |
| 7,519,916 B1* | 4/2009 | Hartwell et al. | 715/771 |
| 7,835,758 B2* | 11/2010 | Tu et al. | 455/466 |
| 7,953,395 B1* | 5/2011 | Richardson et al. | 455/413 |
| 2003/0028647 A1* | 2/2003 | Grosu | 709/227 |
| 2003/0065802 A1* | 4/2003 | Vitikainen et al. | 709/231 |
| 2003/0093337 A1* | 5/2003 | Song et al. | 705/27 |
| 2004/0248561 A1* | 12/2004 | Nykanen et al. | 455/414.2 |
| 2005/0004997 A1* | 1/2005 | Balcisoy et al. | 709/219 |
| 2005/0064883 A1* | 3/2005 | Heck et al. | 455/466 |
| 2005/0193069 A1* | 9/2005 | Brown et al. | 709/206 |
| 2006/0069670 A1* | 3/2006 | Khaliq et al. | 707/3 |
| 2006/0099942 A1* | 5/2006 | Tu et al. | 455/419 |
| 2007/0106759 A1* | 5/2007 | Willie et al. | 709/219 |
| 2007/0191034 A1* | 8/2007 | Lee et al. | 455/466 |
| 2009/0325614 A1* | 12/2009 | Sohn et al. | 455/466 |

FOREIGN PATENT DOCUMENTS

| | | |
|---|---|---|
| EP | 1 628 496 A1 | 2/2006 |
| EP | 1 737 158 A2 | 12/2006 |
| WO | WO 2006/061587 A1 | 6/2006 |

OTHER PUBLICATIONS

Document Viewer. docs.epoline.org/doc/epoline/registerplus/en/1384.htm. Feb. 2005.*
European Search Report dated Mar. 10, 2009 in connection with European Patent Application No. EP 08 16 8684.

* cited by examiner

*Primary Examiner* — Nathan Mitchell

(57) ABSTRACT

A mobile terminal and multimedia message processing method thereof is provided for efficiently processing a multimedia message composed of multiple pages. A multimedia message processing method of the present invention includes receiving a message arrival alert containing a preview page selected among multiple pages constituting a multimedia message; displaying the preview page; determining whether an event allowing or rejecting download of the remaining pages of the multimedia message is received; and rejecting, when an event for rejecting download of the remaining pages of the multimedia message is received, download of the remaining pages of the multimedia message. The multimedia message processing method of the present invention allows a user to determine whether to download the entire multimedia message after viewing a preview page carried by a message arrival alert, thereby avoiding download of unwanted multimedia message, resulting in reduction of data service cost and improvement of memory utilization.

12 Claims, 3 Drawing Sheets

MOBILE TERMINAL AND MULTIMEDIA MESSAGE PROCESSING METHOD THEREOF

CROSS-REFERENCE TO RELATED APPLICATION(S) AND CLAIM OF PRIORITY

The present application claims priority to an application entitled "MOBILE TERMINAL AND MULTIMEDIA MESSAGE PROCESSING METHOD THEREOF" filed in the Korean Intellectual Property Office on Nov. 12, 2007 and assigned Serial No. 2007-0114706, the contents of which are incorporated herein by reference.

TECHNICAL FIELD OF THE INVENTION

The present invention relates to a mobile communication field and, in particular, to a mobile terminal and multimedia message processing method thereof that is capable of efficiently processing multimedia message composed of multiple pages.

BACKGROUND OF THE INVENTION

With the advance of mobile communication technologies and devices, voice and data communications can be conducted anytime anywhere. Recent mobile terminals are evolving to multimedia communication terminals with various supplementary functions such as messaging service, audio and video playback, and game functions.

Among them, the messaging service (i.e. short message service (SMS)) has grown rapidly in popularity in addition to the fundamental voice communication. SMS allows the interchange of short text messages between mobile terminals. Recently, the messaging service has developed in the form Enhanced Messaging Service (EMS) and Multimedia Messaging Service (MMS) which enables carrying various types of data such as audio including voice and still and motion pictures.

In the case of a multimedia message that is structured in a Synchronized Multimedia Integration Language (SMIL) format, the multimedia message can be saved, played, and viewed after downloading the entire pages constituting the multimedia message. However, receiving a multimedia message longer than a few Kilo-bytes may incur a charge for a few dozen seconds for downloading the multimedia message. Also, in order to support MMS service, the mobile terminal is required to secure enough storage space.

SUMMARY OF THE INVENTION

To address the above-discussed deficiencies of the prior art, it is a primary object to provide a mobile terminal and multimedia message processing method thereof that is capable of minimizing message download time and costly data charge.

Also, the present invention provides a mobile terminal and multimedia message processing method thereof that is capable of efficiently utilizing limited storage space by selectively storing the multimedia message by page.

In accordance with an exemplary embodiment of the present invention, a multimedia message processing method for a mobile terminal includes receiving a message arrival alert containing a preview page selected among multiple pages constituting a multimedia message; displaying the preview page; determining whether an event allowing or rejecting download of the remaining pages of the multimedia message; and rejecting, when an event for rejecting download of the remaining pages of the multimedia message, download of the remaining pages of the multimedia message.

In accordance with another exemplary embodiment of the present invention, a multimedia message processing method for a mobile terminal includes receiving a message arrival alert for alerting the arrival of a multimedia message composed of multiple pages and downloading at least one of the multiple pages.

In accordance with another exemplary embodiment of the present invention, a mobile terminal includes a radio frequency unit which receives a radio signal carrying a preview page selected among multiple pages constituting a multimedia message; a display unit which displays the preview page; and a control unit which determines whether to download the remaining pages of the multimedia message according to user's intention and starts or rejects download of the remaining pages according to the determination result.

In accordance with another exemplary embodiment of the present invention, a mobile terminal includes a radio frequency unit which receives a radio signal carrying a message arrival alert for alerting arrival of multimedia message composed of a plurality of pages; a control unit which downloads at least one of the pages in response to the message arrival alert; and a memory unit for storing the at least one page downloaded by the control unit.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION OF THE INVENTION

FIGS. 1 through 4, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged mobile terminal.

Figure 1:
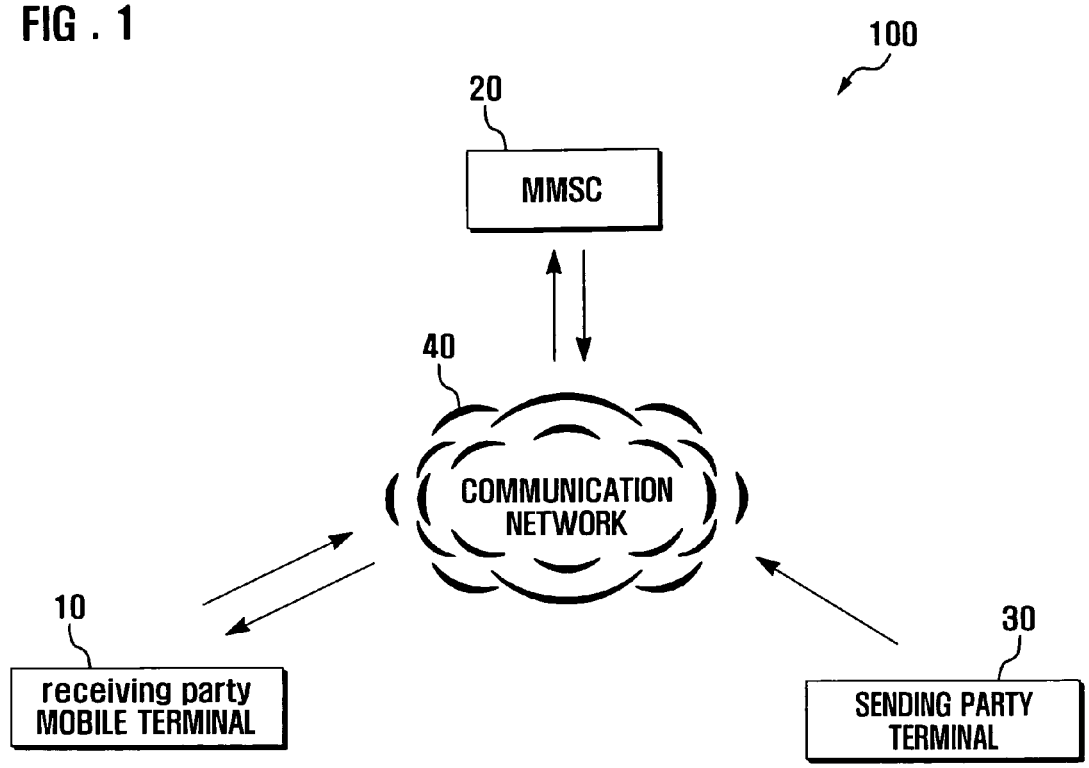
FIG. 1 is a schematic Multimedia Messaging Service (MMS) system according to an exemplary embodiment of the present invention.

FIG. 1 is a schematic Multimedia Messaging Service (MMS) system according to an exemplary embodiment of the present invention. Referring to FIG. 1, the MMS system 100 includes a sending party terminal 30, a receiving party mobile terminal 10, and an MMS center (MMSC) 20 that are connected through a wireless or wired communication network 40. The communication network 40 can be implemented on a physical infrastructure of telephone network, coaxial cable network, or fiber optic network. The communication network 40 also can be any of Packet Switched Network (PSN), Integrated Services Digital Network (ISDN), and Broadband-ISDN (BISDN).

The sending party terminal 30 composes a multimedia message and sends the multimedia message to the MMSC 20. The sending party terminal 30 can be any of mobile phone, desktop computer, and laptop computer that support multimedia messaging function.

In this embodiment, the multimedia message is composed in an SMIL format including a plurality of pages. The multimedia message may carry at least one of a still and a motion image, an audio, and text files.

The MMSC 20 is responsible for the delivery of various types of messages including MMS messages and Electronic Mail (E-mail) as well as short text messages. Particularly in this embodiment, the MMSC 20 delivers the MMS message transmitted by the sending party terminal 30 to the receiving party mobile terminal 10. The MMSC 20 is configured to deliver MMS messages by page in response to the request from the receiving party mobile terminal 10.

The multimedia message transmitted from the MMSC 20 to the mobile terminal 10 consists of a header and a data body. Mobile terminal 10 can be either receiving party mobile terminal or sending party terminal. The data body contains the data composed of multiple pages with names arranged in a sequential order. The header contains information on the respective pages contained in the data body.

The mobile terminal 10 receives the multimedia message transmitted by the MMSC 20. Before starting download of the multimedia message, the mobile terminal 10 receives a multimedia message arrival alert message from the MMSC 20. The multimedia message arrival alert message includes a message ID and header information as well as the caller's phone number. The multimedia message arrival alert message may include a part of the pages of the multimedia message.

The mobile terminal can be any of a digital broadcast receiver, a personal digital assistant (PDA), a Smartphone, and a cellular communication terminal such as Global System for Mobile Communication (GSM) terminal, Code Division Multiple Access (CDMA) terminal, Wideband CDMA (WCDMA) terminal, and their equivalent devices, supporting multimedia messaging services.

Particularly in this embodiment, the mobile terminal 10 is configured to download each of the pages constituting the multimedia message selectively such that the user can decide to download the other pages after checking the contents of the pre-downloaded page.

Figure 2:
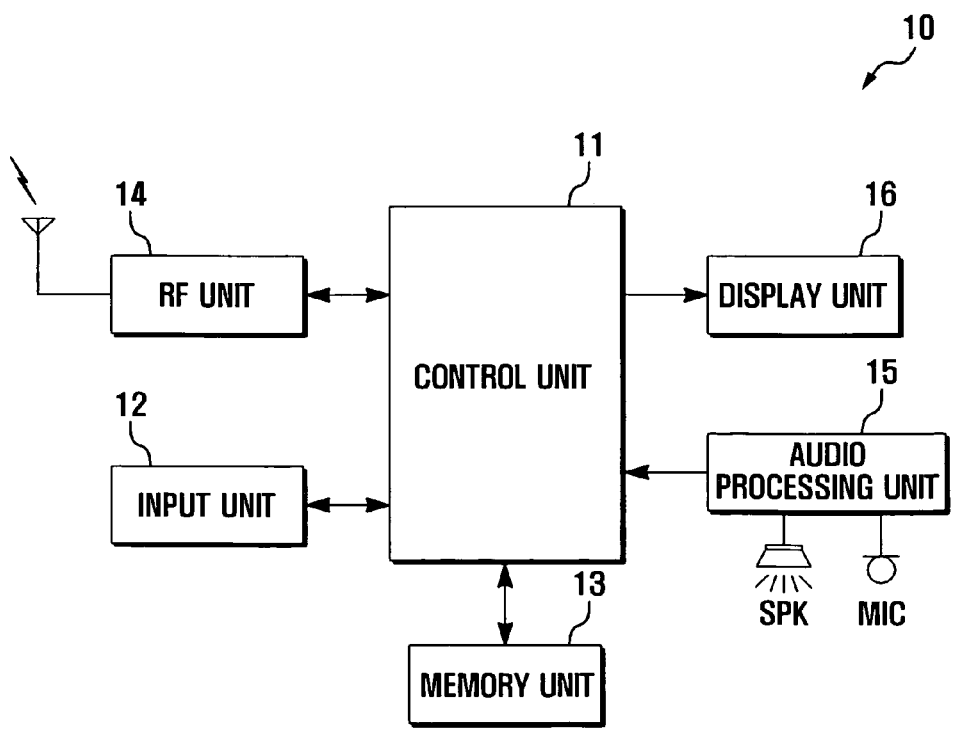
FIG. 2 is a block diagram illustrating a configuration of the mobile terminal of FIG. 1 according to an exemplary embodiment of the present invention.

FIG. 2 is a block diagram illustrating a configuration of the mobile terminal of FIG. 1.

Referring to FIG. 2, the mobile terminal 10 includes a control unit 11, an input unit 12, a memory unit 13, a radio frequency (RF) unit 14, an audio processing unit 15, and a display unit 16.

The control unit 11 is a microprocessor for controlling general operations of the mobile terminal 10. Particularly in this embodiment, the control unit 11 controls the processing of the downloaded multimedia message.

The input unit 12 is provided with a plurality of alphanumeric and function keys for receiving a user command and transmitting the key sequence corresponding to the user command to the control unit 11. The user command can be any of an incoming multimedia message confirmation command and a page selection command. The input unit 12 can be implemented with at least one of a keypad, a touchpad, and a touchscreen.

The memory unit 13 stores application programs associated with functions of the mobile terminal 10 and application data generated while running the application programs. The memory unit 13 can be implemented with at least one of volatile and nonvolatile memory devices. Particularly in this embodiment, the memory unit 13 stores the application programs for supporting the multimedia message and data associated with the multimedia message application programs such as the multimedia message arrival alert message and the downloaded multimedia message.

The RF unit 14 is responsible for radio communication with the MMSC 20. For example, the RF unit 14 receives a radio signal carrying the multimedia message arrival alert message transmitted by the MMSC 20, transmits a radio signal carrying the page selection command to the MMSC 20, and receives a radio signal carrying the selected pages from the MMSC 20.

The audio processing unit 15 converts the analog voice signal input through a microphone (MIC) into digital audio signal and processes the digital audio signal output by the control unit 11 to be output through a speaker (SPK) in the form of audible sound wave.

The display unit 16 displays the menu screen associated with various functions of the mobile terminal 10 and operation status of the mobile terminal 10. The display unit 16 also displays a multimedia message application screen for presenting the multimedia message by page. The display unit 16 can be implemented using a liquid crystal display (LCD) particularly having touchscreen functionality. In this case, the display unit 16 can work as a part of the input unit 12.

Particularly in this embodiment, the control unit 11 controls receiving the multimedia message arrival alert message with or without a specific page of the multimedia message according to the user setting or default setting. The multimedia message arrival alert message includes the caller's phone number and the message ID and header information of the multimedia message.

How the arrival of a multimedia message is indicated by a multimedia message arrival alert message containing a preview page of the multimedia message is described hereinafter.

Once a multimedia message arrival alert message is received, the control unit 11 alerts the arrival of a multimedia message by outputting an alert sound through the audio processing unit 15. At this time, the multimedia message arrival alert message may include a preview page (e.g., the first page or the smallest size page of the incoming multimedia message). However, the present invention is not limited therein. Next, the control unit 11 instructs the display unit 16 to display a query message asking whether to receive the multimedia message. If a reception confirmation command is input through the input unit 12 in response to the query message, the control unit 11 instructs the display unit 16 to display the preview page The control unit 11 determines whether to download the remaining pages according to a user command input through the input unit 12. When the user command is a download confirmation command, the control unit 11 downloads the remaining pages of the multimedia message. Otherwise, if the user command is a download cancel command, the control unit 11 rejects the downloading the remaining pages of the multimedia message. That is, when a predetermined display time of the preview page has expired or a navigation command for viewing the next page is input, the control unit 11 displays a query message asking whether to download the remaining pages of the multimedia message. If a user command is input while the query message is displayed, the control unit 11 processes the multimedia message according to the user command.

The query message is provided with "display next page", "display selected page", "display whole pages", and "reject download" options. When the "display next page" option is selected by the user, the control unit 11 requests the next page of the preview page from the MMSC 20. When the "display selected page" option is selected, the control unit 11 requests the selected page of the multimedia message from the MMSC 20. When the "display whole pages" option is selected, the control unit 11 requests the remaining pages of the multimedia message from the MMSC 20. In the meantime, when the "reject download" option is selected, the control unit 11 requests that the MSC 20 discard the remaining pages of the multimedia message.

How the arrival of a multimedia message is indicated by a multimedia message arrival alert message having no preview page of the multimedia message is described hereinafter.

Once a multimedia message arrival alert message is received, the control unit 11 alerts the arrival of a multimedia message by outputting an alert sound through the audio processing unit 15. Next, the control unit 11 instructs the display unit 16 to display a query message asking whether to receive the multimedia message. If a reception confirmation command has been input through the input unit 12 in response to the query message, the control unit 11 requests the multimedia message from the MMSC 20. The multimedia message can be requested by page such that only the pages selected by the user are downloaded.

At this time, the multimedia message arrival alert message may include a caller's phone number and the message ID and header information of the multimedia message. The header information may include the page information for creating blank pages. When the reception confirmation command is input, the control unit 11 creates blank pages on the basis of the page information contained in the multimedia message arrival alert message and displays the blank pages on the display unit 16. The blank pages are displayed by page and in the form of a thumbnail or text message. The blank pages are provided with page numbers and information about content type such as video, audio, and text. The content type can be indicated in the form of a text or icon.

Once at least one blank page is selected on the display unit 16, the control unit 11 requests the page corresponding to the selected blank page from the MMSC 20. Next, the control unit 11 replaces the blank page with the original page downloaded from the MMSC 20. At this time, the blank pages can be selected in sequential order or randomly.

When the downloaded pages are displayed in the form of thumbnail images or text and the user selects one of the thumbnail images or text, control unit 11 displays the selected page in the form of a full screen image. The control unit 11 allows the user to confirm whether to download the remaining pages that are not received yet with reference to the contents previewed in the full screen image. The above described multimedia message processing functions can be specified in the User Agent Profile (UAProfile) of the mobile terminal 10. For example, the UAProfile specifies that the mobile terminal 10 supports "per-MMS SMIL page download" feature.

Multimedia Message Processing Method

Figure 3:
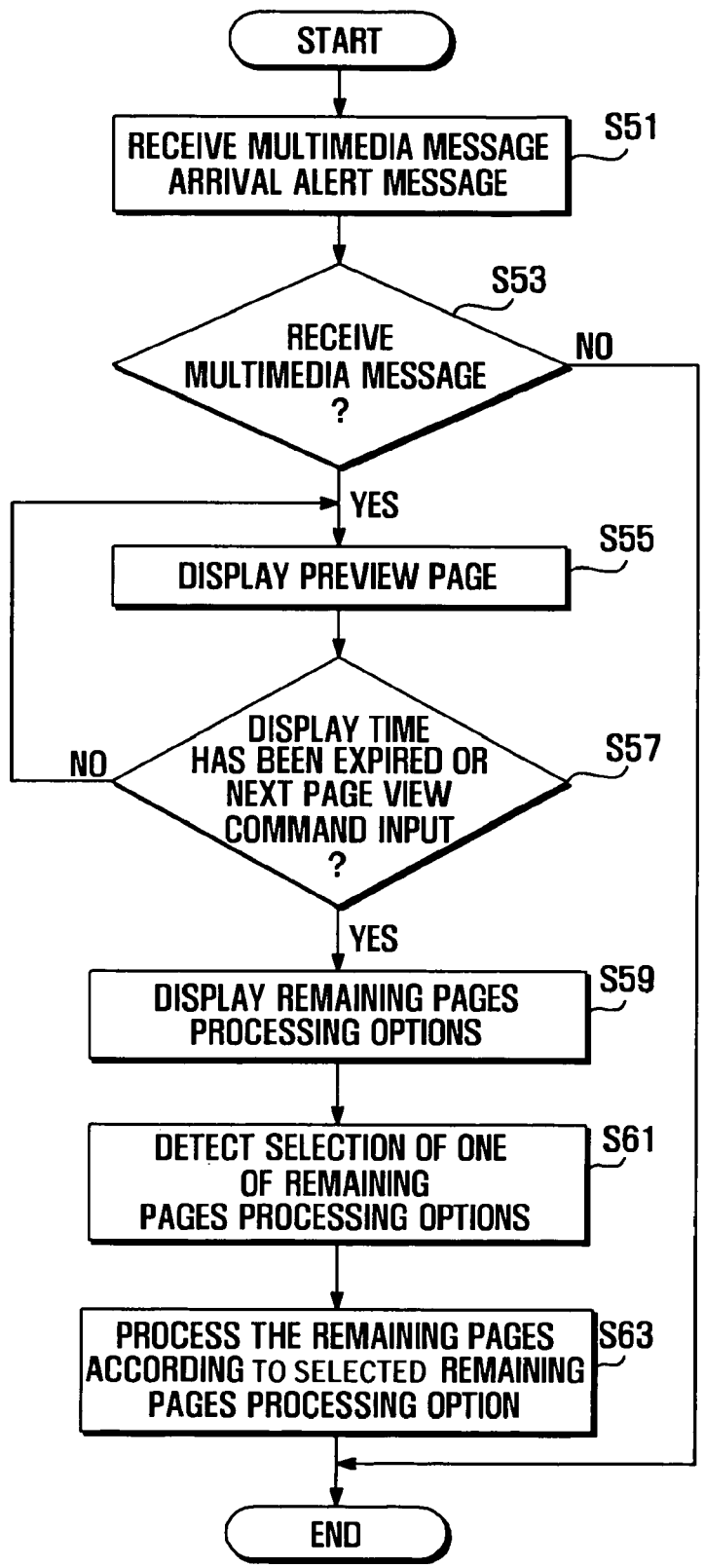
FIG. 3 is a flowchart illustrating a multimedia message processing method according to an exemplary embodiment of the present invention.

FIG. 3 is a flowchart illustrating a multimedia message processing method according to an exemplary embodiment of the present invention.

Referring to FIGS. 1 to 3, the mobile terminal 10 first receives a multimedia message arrival alert message (S51). The multimedia message arrival alert message contains a preview page of the multimedia message and is transmitted by the MMSC 20. Preferably, the UAProfile of the mobile terminal 10 specifies that the mobile terminal 10 supports "per-MMS SMIL page download" capability. The MMSC 20 checks the UAProfile of the mobile terminal 10 to determine whether the mobile terminal 10 supports "per-MMS SMIL page download" capability before sending the multimedia message arrival alert message. When it is determined that the mobile terminal 10 supports "per-MMS SMIL page download" capability, the MMSC 20 sends the multimedia message arrival alert message containing the preview page of the multimedia message. The multimedia message arrival alert message also contains the caller's phone number, the message ID and the header information of the multimedia message. The control unit 11 saves the multimedia message arrival alert message in the memory unit 13. In the meantime, when the mobile terminal 10 does not support "per-MMS SMIL page download" capability, the MMSC 20 performs a normal MMS message processing procedure.

Once the multimedia message arrival alert message is received, the control unit 11 instructs the display unit 16 to display a query message asking whether to receive the multimedia message (S53). At this time, the control unit 11 instructs the audio processing unit 15 to output an alert sound to indicate the arrival of the multimedia message.

If a reception confirmation command is input in response to the query message, the control unit 11 instructs the display unit 16 to display a preview page carried by the multimedia message arrival alert message (S55). Next, the control unit 11 determines whether a predetermined display time has expired or a next page view command is input (S57).

If the display time has not expired and no next page view command is input, the control unit 11 maintains the display of the preview page.

Otherwise, if the display time has expired or the next page view command is input, the control unit 11 instructs the display unit 16 to display the remaining pages processing options on the display unit 16 (S59). The control unit 11 detects a user selection on one of the remaining pages processing options (S61) and processes the remaining pages of the multimedia message according to the selected multimedia processing option (S63). The control unit 11 displays the remaining pages processing options after notifying the user that there are pages that are not downloaded yet.

The remaining pages processing options include "display next page", "display selected page", "display whole pages", and "reject download" options. If the "display next page" option is selected at step S61, the control unit 11 requests the next page following the preview page from the MMSC 20. If the "display selected page" option is selected, the control unit 11 requests the selected page of the multimedia message from the MMSC 20. If the "display whole pages" option is selected, the control unit 11 requests the remaining pages of the multimedia message from the MMSC 20. In the meantime, if the "reject download" option is selected, the control unit 11 requests that the MSC 20 discard the remaining pages of the multimedia message without downloading the remaining pages.

In more detail, if the user selected the "display next page" option, the control unit 11 requests that the MMSC 20 send the page following the preview page. Upon receipt of the request from the mobile terminal 10, the MMSC 20 sends the next page with the message ID. In the case that the page received from the MMSC 20 has the same message ID as the previously received message, the control unit 11 combines the currently downloaded page with the previously received page and stores the combined pages as a single multimedia message.

In the meantime, if the user selected the "reject download" option, the control unit 11 ends the multimedia message processing. At this time, the control unit 11 may save the multimedia message arrival alert message itself or only the log data such as the caller's phone number extracted from the multimedia message arrival alert message.

Figure 4:
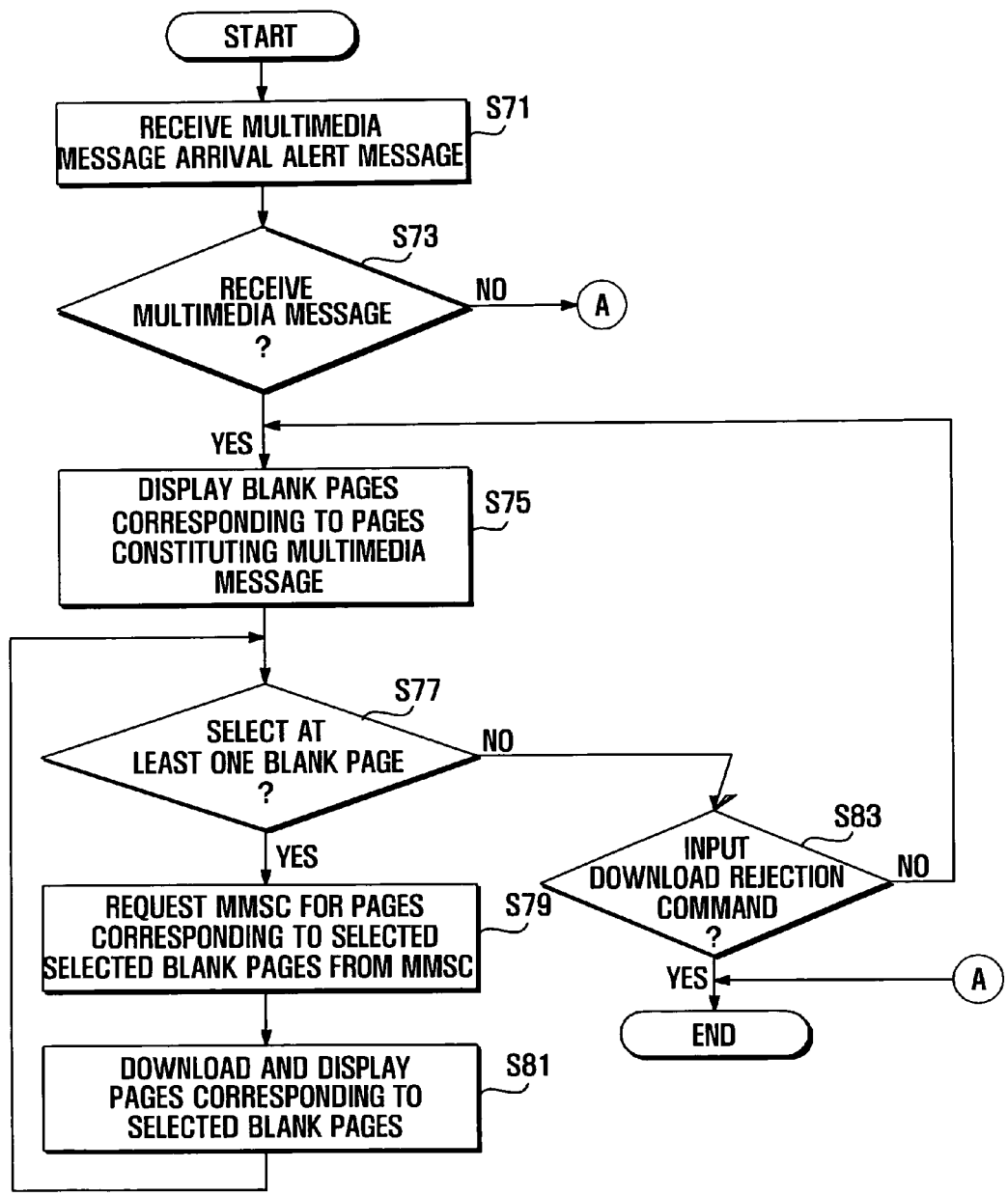
FIG. 4 is a flowchart illustrating a multimedia message processing method according to another exemplary embodiment of the present invention.

FIG. 4 is a flowchart illustrating a multimedia message processing method according to another exemplary embodiment of the present invention.

Referring to FIGS. 1, 2, and 4, the mobile terminal 10 receives a multimedia message arrival alert message which indicates the arrival of a multimedia message (S71). The multimedia message arrival alert message includes the caller's phone number and the message ID and header information. The control unit 11 stores the multimedia message arrival alert message within the memory unit 13.

Upon receipt of the multimedia message arrival alert message, the control unit 11 instructs the display unit 16 to display a query message asking whether to receive the multimedia message (S73). At this time, the control unit 11 also instructs the audio processing unit 15 to output an alert sound for indicating the arrival of the multimedia message.

If a reception confirmation command is input in response to the query message, the control unit 11 creates blank pages corresponding to actual pages constituting the multimedia message on the display unit 16 with reference to the header information of the multimedia message (S75). The blank pages can be presented in the form of thumbnail images.

Next, the control unit 11 determines whether a page selection command is input for selecting at least one of the blank pages (S77). If a page selection command is input, the control unit 11 requests the page corresponding to the at least one blank page indicated by the page selection command from the MMSC 20 (S79). At this time, the user can select the blank pages in sequential order or randomly.

Next, the control unit 11 downloads the selected pages from the MMSC 20 and displays the downloaded page in place of the corresponding blank page (S81). At this time, if the user selects the downloaded page by means of the input unit 12, the control unit 11 presents the selected page in full screen. Next, the control unit 11 repeats step S77 for downloading the remaining pages of the multimedia message in accordance with the user's intention.

In the meantime, if a reception rejection command is input in response to the query message at step S73, the control unit 11 ends the multimedia message processing procedure. At this time, the control unit 11 may save the multimedia message arrival alert message or only log data such as the caller's phone number contained in the incoming MMS.

If no page selection command has been input within a predetermined time (i.e. no blank page is selected) at step S77, the control unit 11 determines whether a download rejection command is input (S83). If a download rejection command has been input, the control unit 11 ends the multimedia message processing procedure. Otherwise, if the download cancel command has not been input within a predetermined time, the control unit 11 maintains displaying the blank pages.

Although exemplary embodiments of the present invention have been described in detail hereinabove, it should be clearly understood that many variations and/or modifications of the basic inventive concepts herein taught which may appear to those skilled in the present art will still fall within the spirit and scope of the present invention, as defined in the appended claims.

As described above, the multimedia message processing method of the present invention allows a user to determine whether to download the entire multimedia message after viewing a preview page carried by a multimedia message arrival alert, thereby avoiding download of unwanted multimedia message, resulting in reduction of data service cost and improvement of memory utilization.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A multimedia message processing method for a mobile terminal, comprising:
receiving a message arrival alert for indicating an arrival of a multimedia message comprising at least one page, the message arrival alert comprising header information that comprises page information for structuring at least one blank page corresponding to the at least one page of the multimedia message; and
downloading the at least one page.

2. The multimedia processing method of claim 1, wherein the message arrival alert further comprises a caller's phone number and a message identification (ID).

3. The multimedia processing method of claim 2, wherein the page information comprises at least one of a page number and a content type for the at least one blank page.

4. The multimedia processing method of claim 3, wherein downloading the at least one page comprises:
creating and displaying at least one blank page corresponding to the at least one page based on the page information;
determining whether at least one blank page is selected for download;
downloading the at leaset one page corresponding to the at least one selected blank page; and
displaying the at least one downloaded page in place of the corresponding at least one blank page.

5. The multimedia processing method of claim 4, wherein the at least one blank page is selected in one of sequential and random order.

6. The multimedia processing method of claim 5, further comprising:
downloading the at least one remaining page in response to a download confirmation command; and
rejecting download of the at least one remaining page in response to a download rejection command.

7. A mobile terminal comprising:
a radio frequency unit configured to receive a radio signal carrying a message arrival alert for indicating an arrival of a multimedia message composed of at least one page, the message arrival alert comprising header information that comprises page information for structuring at least one blank page corresponding to the at least one page of the multimedia message;

a control unit configured to download at least one page according to a user input; and a memory unit configured to store the at least one page downloaded by the control unit.

8. The mobile terminal of claim 7, wherein the message arrival alert further comprises a caller's phone number and a message identification (ID).

9. The mobile terminal of claim 8, wherein the page information comprises at least one of a page number and a content type for the at least one blank page.

10. The mobile terminal of claim 9, further comprising:

a display unit configured to display a user interface according to control by the control unit; and an input unit configured to receive the user input, wherein the control unit is further configured to control the display unit to display at least one blank page corresponding to the at least one page based on the page information, determine whether at least one of the at least one blank page is selected for download based on user input received by the input unit, download the at least one page corresponding to the at least one selected blank page, and display the at least one downloaded page in place of the corresponding at least one blank page on the display unit.

11. The mobile terminal of claim 10, wherein the at least one blank page is selected in one of sequential and random order.

12. The mobile terminal of claim 11, wherein the control unit is further configured to download the at least one remaining page in response to a download confirmation command, and reject a download of the at least one remaining page in response to a download rejection command.

* * * * *